United States Patent
Kobayashi et al.

(10) Patent No.: US 7,616,428 B2
(45) Date of Patent: Nov. 10, 2009

(54) SEPARATOR FOR ELECTRIC DOUBLE LAYER CAPACITOR AND ELECTRIC DOUBLE LAYER CAPACITOR CONTAINING SAME

(75) Inventors: Takeshi Kobayashi, Ibaraki (JP);
Masaaki Kawabe, Ibaraki (JP);
Fuminori Kimura, Tokyo (JP);
Masahiro Amagasa, Ibaraki (JP)

(73) Assignee: Japan Vilene Company, Ltd., Tokyo (JP)

( * ) Notice: Subject to any disclaimer, the term of this patent is extended or adjusted under 35 U.S.C. 154(b) by 0 days.

(21) Appl. No.: 10/560,460

(22) PCT Filed: Nov. 1, 2005

(86) PCT No.: PCT/JP2005/020075
§ 371 (c)(1),
(2), (4) Date: Dec. 14, 2005

(87) PCT Pub. No.: WO2006/049151
PCT Pub. Date: May 11, 2006

(65) Prior Publication Data
US 2007/0247785 A1    Oct. 25, 2007

(30) Foreign Application Priority Data
Nov. 2, 2004  (JP) ............................. 2004-318693

(51) Int. Cl.
*H01G 9/00* (2006.01)
(52) U.S. Cl. .................................................... 361/502
(58) Field of Classification Search ................. 361/502
See application file for complete search history.

(56) References Cited

U.S. PATENT DOCUMENTS

| 4,697,224 | A  | * | 9/1987 | Watanabe et al. ............ 361/502 |
| 6,411,497 | B2 | * | 6/2002 | Kimura et al. ................ 361/502 |
| 7,112,389 | B1 | * | 9/2006 | Arora et al. .................. 429/128 |
| 2002/0045091 | A1 | | 4/2002 | Kamei et al. ................... 429/62 |
| 2002/0090876 | A1 | * | 7/2002 | Takase et al. ................. 442/363 |
| 2003/0086171 | A1 | * | 5/2003 | McGuire ..................... 359/497 |

FOREIGN PATENT DOCUMENTS

| JP | 03-161563 |   | 11/1991 |
| JP | 07279024 A | * | 10/1995 |
| JP | 08339819 A | * | 12/1996 |
| JP | 2003/168629 |   | 6/2003 |
| JP | 2003/229329 |   | 8/2003 |
| JP | 2003-105660 |   | 9/2003 |
| JP | 2004/115980 |   | 4/2004 |

OTHER PUBLICATIONS

Machine Translation of JP2003-105660.*
Ferreira, A multi-layered approach for absorptive glass-mat separator, 1999, Journal of Power Sources, 78, pp. 41-45.*

* cited by examiner

*Primary Examiner*—Eric Thomas
*Assistant Examiner*—David M Sinclair
(74) *Attorney, Agent, or Firm*—Heslin Rothenberg Farley & Mesiti P.C.

(57) ABSTRACT

A separator for an electric double layer capacitor, characterized in that a thickness of the entire separator is 25 μm or less, a layer of an ultrafine fibrous aggregate prepared by an electrostatic spinning process is contained, an average fiber diameter of ultrafine fibers constituting the ultrafine fibrous aggregate layer is 1 μm or less, and a maximum pore size of the ultrafine fibrous aggregate is not more than 3 times a mean flow pore size is disclosed.

10 Claims, No Drawings

SEPARATOR FOR ELECTRIC DOUBLE LAYER CAPACITOR AND ELECTRIC DOUBLE LAYER CAPACITOR CONTAINING SAME

CROSS-REFERENCE TO RELATED APPLICATIONS

This application is a 371 filing of PCT International Application No. PCT/JP2005/020075 filed on Nov. 1, 2005 claiming the priority of Japanese Application No. 2004-318693 filed on Nov. 2, 2004, the disclosures of which are hereby incorporated by reference in their entirety.

TECHNICAL FIELD

The present invention relates to a separator for an electric double layer capacitor and an electric double layer capacitor containing the same. More particularly, the present invention relates to a separator preferably applicable to a thin electric double layer capacitor, and a thin electric double layer capacitor.

BACKGROUND ART

An electric double layer capacitor has a relatively large capacity and a long life-time, and allows a quick charge and discharge. Therefore, it has been used not only in conventional applications, such as a leveling of an electric power source or an absorption of noise, but also in a memory-backup power source for a personal computer, or as an auxiliary or substitutive source of a secondary battery. Recently, the electric double layer capacitor is expected to be used as a secondary battery for an electric vehicle.

The electric double layer capacitor has a structure wherein a pair of electrodes is immersed in an ionic solution. When a voltage is applied to the electric double layer capacitor, ions having a charge opposite to that of each electrode are distributed around each electrode to form layers of ions, whereas, in the electrodes, charges opposite to the outside ions are accumulated. Then, if a load is connected between the electrodes, the charges in the electrodes are discharged, and at the same time the ions distributed around the electrodes move away therefrom so that the capacitor is returned to a neutralized state.

If a pair of the electrodes is brought into contact with each other in the electric double layer capacitor, it becomes difficult to form the ion layer around the electrodes. Therefore, a separator is usually placed between the electrodes. The separator is required to have a property of avoiding a short circuit between the electrodes as above, and further a good property of holding an electrolyte and an ionic permeability.

If a thin separator is used as a separator for the electric double layer capacitor, the electric double layer capacitor can be thinned. Thus, porous membranes were proposed as the separator. For example, a separator made of a polyimide porous film having nonlinear fine holes was proposed (patent reference 1; particularly, in claim 1).

As other separators for the electric double layer capacitor, proposed were a separator of a nonwoven fabric prepared by a melt blowing method (patent reference 2; particularly, page 3, paragraphs [0046] to [0050]), a separator of a nonwoven fabric prepared by a wet-laying method using ultrafine fibers of island components obtained by removing a sea component in islands-in-sea fibers (patent reference 3; particularly, Examples), and a separator of a nonwoven fabric prepared by a wet-laying method using fibrillated organic polymer (patent reference 4; particularly, Examples).

[patent reference 1] Japanese Unexamined Patent Publication (Kokai) No. 2003-229329
[patent reference 2] US2002/0045091A1
[patent reference 3] Japanese Unexamined Patent Publication (Kokai) No. 2004-115980
[patent reference 4] Japanese Unexamined Patent Publication (Kokai) No. 2003-168629

DISCLOSURE OF THE INVENTION

Problems to be Solved by the Invention

The porous film disclosed in patent reference 1 does not have a sufficient holding electrolyte property. Further, if the thickness is reduced to enhance an ionic permeability, a property of preventing a short circuit becomes lower. If the thickness is increased to enhance the property of preventing a short circuit, the ionic permeability is deteriorated, and at the same time, the electric double layer capacitor becomes thicker. This does not satisfy both the ionic permeability and the property of preventing a short circuit, at the same time.

The separator of the melt blown nonwoven fabric disclosed in patent reference 2 has a large value of mean pore size, a wide distribution of pore sizes, a relatively large diameter of fibers, and uneven fiber diameters. Therefore, if the thickness is reduced to enhance the ionic permeability, pin holes are produced, and an electrical current is liable to leak therethrough.

The separators disclosed in patent references 3 and 4 are prepared by a wet-laying method. Therefore, if the thickness is reduced to enhance the ionic permeability, pin holes are produced during the wet-laying step for preparing a fiber web, and an electrical current is liable to leak therethrough. Further, an adhesive agent, a thickening agent, and a surfactant which are added to slurry when a fiber web is formed remain in the separator, and thus, cause a reduction of an electrical insulation.

Further, ultrafine fibers which have a fiber diameter of 1 μm or less and are composed of island components prepared by removing a sea component from islands-in-sea fibers prepared by a blend spinning method are known. An attempt to form a fiber web from such ultrafine fibers by a wet-laying method was made. However, it was very difficult to uniformly disperse the ultrafine fibers. The wet-laid fiber web contained many fiber masses, and it was very difficult to obtain a thin separator having uniform pore sizes.

The present invention has been completed to solve the above problems, and the object of the present invention is to provide a separator for the electric double layer capacitor, having an excellent holding electrolyte property, a property of preventing a leakage of an electrical current, and capable of satisfying both a property of preventing a short circuit and an ionic permeability, and an electric double layer capacitor containing the same.

MEANS FOR SOLVING THE PROBLEMS

The above problems may be solved by the present invention, that is, a separator for an electric double layer capacitor, characterized in that a thickness of the entire separator is 25 μm or less, a layer of an ultrafine fibrous aggregate prepared by an electrostatic spinning process is contained, an average fiber diameter of ultrafine fibers constituting the ultrafine fibrous aggregate layer is 1 μm or less, and a maximum pore size of the ultrafine fibrous aggregate is not more than 3 times a mean flow pore size.

According to a preferable embodiment of the present separator, a thickness of the entire separator is 20 μm or less.

According to another preferable embodiment of the present separator, the mean flow pore size of the ultrafine fibrous aggregate layer is 1 μm or less.

According to a still another preferable embodiment of the present separator, a ratio (Dd/Da) of a standard deviation (Dd) of fiber diameters of ultrafine fibers constituting the ultrafine fibrous aggregate layer to an average fiber diameter (Da) of ultrafine fibers constituting the ultrafine fibrous aggregate layer is 0.25 or less.

According to a still another preferable embodiment of the present separator, the ultrafine fiber is composed of at least one resin selected from the group consisting of polyacrylonitrile, polyvinylidene fluoride, polyimide, nylon, polystyrene, polyethylene glycol, polyvinyl alcohol, and polyvinyl pyrrolidone.

According to a still another preferable embodiment, the present separator further contains a non-ultrafine fibrous aggregate layer having an average fiber diameter of not less than 1 μm, in addition to the ultrafine fibrous aggregate layer.

According to a still another preferable embodiment of the present separator, a porosity of the separator is 50% to 95%.

According to a still another preferable embodiment of the present separator, a tensile strength per 1 $g/m^2$ in mass per unit area is 0.15 N/5 mm width or more in at least one direction of the separator.

The present invention also relates to an electric double layer capacitor comprising the above separator.

EFFECTS OF THE INVENTION

The separator of the present invention has an entire thickness of 25 μm or less, and contains a layer of an ultrafine fibrous aggregate prepared by an electrostatic spinning process, wherein an average fiber diameter of ultrafine fibers constituting the ultrafine fibrous aggregate layer is 1 μm or less, and a maximum pore size of the ultrafine fibrous aggregate layer is not more than 3 times a mean flow pore size. Therefore, there is very little electrical current leakage, a property of preventing a short circuit is excellent, and a holding electrolyte property is excellent because many very fine pores are formed. Further, because the entire thickness is very thin, that is, 25 μm or less, an ionic permeability is excellent. Furthermore, because the separator contains the ultrafine fibrous aggregate layer prepared by an electrostatic spinning process, it does not lower an electrical insulation. That is, in contrast with a conventional wet-laying method, an adhesive agent, a thickening agent, and a surfactant, which are added to a slurry when a fiber web is formed, do not remain in the separator, and thus, an electrical insulation is not lowered.

When a thickness of the entire separator is 20 μm or less, an ionic permeability is further enhanced.

When the mean flow pore size of the ultrafine fibrous aggregate layer is 1 μm or less, there is very little electrical current leakage, and a property of preventing a short circuit becomes excellent.

When a ratio (Dd/Da) of a standard deviation (Dd) of fiber diameters of ultrafine fibers constituting the ultrafine fibrous aggregate layer to an average fiber diameter (Da) of ultrafine fibers constituting the ultrafine fibrous aggregate layer is 0.25 or less, that is, the fiber diameters of the ultrafine fibers are uniform, there is very little electrical current leakage, and the properties of preventing a short circuit, and of holding an electrolyte are excellent.

When the ultrafine fiber is composed of at least one resin selected from the group consisting of polyacrylonitrile, polyvinylidene fluoride, polyimide, nylon, polystyrene, polyethylene glycol, polyvinyl alcohol, and polyvinyl pyrrolidone, the separator is not affected by the electrolyte, and thus, the excellent properties of preventing a short circuit and of holding an electrolyte are maintained for a long time.

When the separator further contains a non-ultrafine fibrous aggregate layer having an average fiber diameter of not less than 1 μm, in addition to the ultrafine fibrous aggregate layer, the ionic permeability becomes more excellent and the holding electrolyte property is excellent.

When a porosity of the separator is high, the holding electrolyte property becomes even more excellent.

When a tensile strength per 1 $g/m^2$ in mass per unit area is 0.15 N/5 mm width or more in at least one direction of the separator, that is, a mechanical strength is excellent, the electric double layer capacitor can be easily prepared.

The electric double layer capacitor of the present invention contains the separator as above, and thus, has a low internal resistance, and a long life-time.

BEST MODE FOR CARRYING OUT THE INVENTION

The present separator for the electric double layer capacitor (hereinafter referred to only as "separator") may be composed only of the ultrafine fibrous aggregate layer prepared by an electrostatic spinning process, that is, consist of only the ultrafine fibrous aggregate layer, or may comprise one or more layers other than the layer of the ultrafine fibrous aggregate. The present separator contains the ultrafine fibrous aggregate layer wherein the aggregate is composed of the ultrafine fibers having an average fiber diameter of 1 μm or less, and a maximum pore size of the aggregate is not more than 3 times a mean flow pore size. That is, the pore size is small and a distribution of the pore sizes is narrow. Therefore, the present separator has excellent properties of preventing a leakage of an electrical current and a short circuit, and of holding an electrolyte. The ultrafine fibrous aggregate layer may contain ultrafine fibers having different average fiber diameters, fiber lengths and/or resin components in the form of a mixture or one or more layers, so long as the ultrafine fibrous aggregate layer satisfies the above requirements, that is, the layer is prepared by an electrostatic spinning process, an average fiber diameter is 1 μm or less, and a maximum pore size is not more than 3 times a mean flow pore size.

First, the present separator composed only of the ultrafine fibrous aggregate will be described hereinafter.

The smaller the average fiber diameter of the ultrafine fibers constituting the ultrafine fibrous aggregate, the more excellent the properties of preventing the leakage of an electrical current and a short circuit, and of holding an electrolyte are. Therefore, the average diameter of the ultrafine fibers is preferably 0.8 μm or less, more preferably, 0.6 μm or less. There is no lower limit of the average fiber diameter of the ultrafine fibers, but it is appropriately around 1 nm. The term "fiber diameter" as used herein means a diameter of a cross section of a fiber, which diameter can be measured in an electron microscopic picture of the fibrous aggregate. When the shape of the cross section of the fiber is not a circle, a diameter of a circle having an area the same as that of the noncircular cross section is regarded as the fiber diameter.

The term "average fiber diameter" as used herein means an arithmetic average of fiber diameters of 50 or more fibers.

The separator of the present invention is composed of the ultrafine fibrous aggregate prepared by an electrostatic spinning process, and thus, the fiber diameters of the ultrafine fibers are uniform, the pore sizes are small, and a distribution of the pore sizes is narrow. Therefore, it has excellent properties of preventing the leakage of an electrical current and a short circuit, and of holding an electrolyte. More particularly, a ratio (Dd/Da) of a standard deviation (Dd) of fiber diameters of ultrafine fibers constituting the ultrafine fibrous aggregate to an average fiber diameter (Da) of ultrafine fibers constituting the ultrafine fibrous aggregate is preferably 0.25 or less. The small value of the ratio (Dd/Da) means that the fiber diameters of the ultrafine fibers are uniform. In view of the excellence of the properties of preventing a leakage of an electrical current and a short circuit and of holding an electrolyte, the ratio (Dd/Da) is preferably 0.20 or less. When all the ultrafine fibers have same fiber diameter, the standard deviation becomes 0. Thus, the lower limit of the ratio (Dd/Da) is 0. The ultrafine fibers having an average fiber diameter of 1 μm or less and the ratio (Dd/Da) of 0.25 or less as above may be prepared by an electrostatic spinning process. However, such properties cannot be obtained by a melt blowing method, or from a pulp of fibrillated fibers. The "standard deviation (Dd) of a fiber diameter" as used herein means a value calculated from fiber diameters ($\chi$) measured for discrete ultrafine fibers by the following equation:

$$\text{Standard deviation } (Dd) = \{(n\Sigma\chi^2 - (\Sigma\chi)^2)/n(n-1)\}^{1/2}$$

wherein "n" stands for the number (50 or more) of the ultrafine fibers whose diameters are measured.

A fiber length of the ultrafine fibers constituting the ultrafine fibrous aggregate in the separator of the present invention is not limited. When prepared by an electrostatic spinning process, the fibers are usually continuous fibers. It is preferable that the ultrafine fibers are continuous, because the fibers are rarely dropped out during the production of the electric double layer capacitor. When the ultrafine fibers are continuous as above, the fiber diameter is measured on the basis of an electron microscopic picture of a cross section of the separator in a thickness direction. The average fiber diameter and the standard deviation of the fiber diameter are calculated on the basis of the fiber diameters of 50 or more ultrafine fibers in the electron microscopic picture. The fibers may be made discontinuous by, for example, intermittently discharging a fiberizable liquid.

The ultrafine fibers constituting the ultrafine fibrous aggregate in the separator of the present invention may be formed from a resin which is inert by electrolyte in the electric double layer capacitor, and is preferably composed of, not limited to, for example, at least one resin selected from polyacrylonitrile, polyvinylidene fluoride, polyimide, nylon, polystyrene, polyethylene glycol, polyvinyl alcohol, or polyvinyl pyrrolidone. Of these resins, polyacrylonitrile is preferable, because an ultrafine fibrous aggregate made of the ultrafine fibers having an average fiber diameter of 1 μm or less can be reliably prepared by an electrostatic spinning process.

The separator of the present invention may be formed from the ultrafine fibrous aggregate of the ultrafine fibers as above, and the entire thickness is 25 μm or less to obtain an excellent ionic permeability. The entire thickness is more preferably 20 μm or less, particularly preferably 15 μm or less. If the entire thickness is too thin, there is a tendency to affect the properties of preventing a leakage of an electrical current and a short circuit and a holding electrolyte even if the separator is made of the ultrafine fibers. The entire thickness is preferably 5 μm or more. The term "thickness" as used herein means an arithmetic average of 10 randomly selected points measured in accordance with JIS C2111 5.1(1), using an outside micrometer (0 to 25 mm) defined in JIS B 7502: 1994.

In the separator of the present invention, a tensile strength per 1 g/m$^2$ in mass per unit area is preferably 0.15 N/5 mm width or more in at least one direction of the separator, so that the separator has a mechanical strength which allows an easy production thereof. The stronger the tensile strength per 1 g/m$^2$ in mass per unit area, the easier it is to produce an electric double layer capacitor. Therefore, the tensile strength is preferably 0.5 N/5 mm width or more. There is no upper limit. If an electric double layer capacitor is manufactured in a wound form, a tension is applied to the separator mainly in a longitudinal direction thereof. Therefore, the above-defined value of the tensile strength is preferably satisfied in the longitudinal direction. The "tensile strength per 1 g/m$^2$ in mass per unit area" means a quotient (S/D) obtained by dividing a tensile strength [S (unit: N/5 mm width)] with a mass per unit area [D (unit: g/m$^2$)], and the "tensile strength" means a value obtained by fixing a rectangular separator sample prepared by cutting the separator into a form having a length of 5 cm in a direction perpendicular to a measuring direction and a length of 20 cm in the measuring direction, between the chucks (distance between the chucks: 10 cm) of a tensile strength tester (Orientec Co., Ltd., Tensiron UTM-III-100), pulling the sample at an extending rate of 50 mm/min, and calculating a force required to break the separator having a width of 5 mm. The "mass per unit area" means a mass per 1 m$^2$.

In the separator of the present invention, the ultrafine fibers are preferably bonded to each other with pressure so that the ultrafine fibrous aggregate can have an excellent tensile strength as above. The bonding of the ultrafine fibers to each other with pressure is advantageous in that an ionic permeability is not prevented by a formation of a film, in contrast with the case where the ultrafine fibers are fused to each other. Further, it is also advantageous in that an internal resistance can be lowered, and an energy density per a certain volume can be raised. The "bonding with pressure" as used herein means a state wherein the ultrafine fibers are firmly attached to each other by pressing the fibers without heating, or with heating at a temperature less than a softening point of the ultrafine fibers.

The mass per unit area of the separator of the present invention is not limited, but preferably 1 to 10 g/m$^2$, more preferably 1 to 5 g/m$^2$, still more preferably 1 to 3 g/m$^2$, in view of the excellent properties of holding an electrolyte, preventing a leakage of an electrical current and a short circuit, and an ionic permeability. The apparent density of the separator is not particularly limited, but is preferably 0.1 to 0.8 g/cm$^3$. If the apparent density is less than 0.1 g/cm$^3$, tendencies occur that a handling property is deteriorated, pore sizes become larger, a distribution of pore sizes becomes wider, the properties of preventing a leakage of an electrical current and a short circuit are affected, and the holding electrolyte property is lowered. Thus, the apparent density is more preferably 0.2 g/cm$^3$ or more. On the contrary, if the apparent density is more than 0.8 g/cm$^3$, tendencies occur that a porosity is too low, an ionic permeability is affected, and the holding electrolyte property is lowered. Thus, the apparent density is more preferably 0.7 g/cm$^3$ or less, still more preferably 0.65 g/cm$^3$ or less. The "apparent density" means a quotient (D/T) obtained by dividing a mass per unit area [D (unit: g/cm$^2$)] with a thickness [T (unit: cm)].

It is preferable that the ultrafine fibers constituting the ultrafine fibrous aggregate in the separator of the present invention are not substantially entangled with each other. When the ultrafine fibers are not substantially entangled, the ultrafine fibrous aggregate (i.e., the separator) can have a small pore size, and a narrow distribution of pore sizes, and excellent properties of preventing a leakage of an electrical current and a short circuit and of holding an electrolyte. In other words, if a fluid stream such as a water jet is applied so as to entangle the ultrafine fibers, the ultrafine fibers are rearranged so that the configuration of the ultrafine fibers is disturbed, the pore sizes are increased, and the distribution of the pore sizes is widened. On the contrary, when the ultrafine fibers are not entangled, the configuration of the ultrafine fibers is not disturbed so that the ultrafine fibrous aggregate (i.e., the separator) having small pore sizes and a narrow distribution of the pore sizes may be easily realized. The expression "the ultrafine fibers are not substantially entangled" as above means a state wherein an entangling treatment to rearrange the ultrafine fibers, disturb the configuration of the ultrafine fibers, increase the pore sizes, and widen the distribution of the pore sizes is not carried out.

In the separator of the present invention comprising the ultrafine fibrous aggregate as above, a maximum pore size is 3 times or less (preferably 2.7 times or less) of a mean flow pore size so that the ultrafine fibrous aggregate has excellent properties of preventing a short circuit and of holding an electrolyte and there is very little leakage of an electrical current. In an ideal embodiment, a maximum pore size is one time the mean flow pore size, that is, all the pore sizes are identical to each other. The mean flow pore size of the ultrafine fibrous aggregate is preferably as small as 1 µm or less, more preferably 0.8 µm or less, still more preferably 0.7 µm or less so that there is very little electrical current leakage, and excellent properties of preventing a short circuit and of holding an electrolyte are obtained. The "mean flow pore size" means a value obtained in accordance with a method described in ASTM-F316, for example, a value measured by a mean flow point method using a polometer (Perm Polometer, PMI). The "maximum pore size" means a value measured by a bubble point method using a polometer (Perm Polometer, PMI). The ultrafine fibrous aggregate wherein the maximum pore size is not more than 3 times the mean flow pore size as above can be prepared by an electrostatic spinning process, but is difficult to prepare by a melt-blowing method or a wet-laying method.

The separator of the present invention comprises the ultrafine fibrous aggregate as above, and the ultrafine fibrous aggregate is prepared by an electrostatic spinning process. According to the electrostatic spinning process, the ultrafine fibrous aggregate can be prepared without an adhesive agent, a thickening agent or a surfactant, and thus an electrical insulation is not lowered. That is, in the conventional wet-laying method, an adhesive agent, a thickening agent and a surfactant must be added to a slurry during the production of a fiber web, whereas in the separator of the present invention, an adhesive agent, a thickening agent or a surfactant do not remain therein, and thus an electrical insulation is not lowered.

In the separator of the present invention, a porosity of the separator is preferably 50% to 95%. This is because the holding electrolyte property is excellent when the porosity is 50% or more. The porosity is more preferably 60% or more, still more preferably 65% or more. On the other hand, when the porosity is 95% or less, the property of maintaining the shape of the separator is excellent. The porosity is more preferably 90% or less, still more preferably 85% or less. The expression "porosity (P)" as used herein means a value obtained by the following equation:

$$\text{Porosity } (P) = \{1 - W/(T \times d)\} \times 100$$

wherein W stands for a mass per unit area of the separator (g/m²), T stands for a thickness (µm) of the separator, and d stands for a density (g/cm³) of the fibers constituting the separator. When two or more kinds of fibers constitute the separator, the density of the fibers constituting the separator means an average mass of each constituent fiber. For example, when the fibers A having a density of $d_1$ at an amount of "a" (mass %) and the fibers B having a density of $d_2$ at an amount of "b" (mass %), the density (d) of the constituent fibers is a value obtained by the following equation:

$$\text{Density } (d) = (d_1 \times a)/100 + (d_2 \times b)/100$$

In addition to the layer of the ultrafine fibrous aggregate, the separator of the present invention may contain a reinforcing layer (such as a microporous film layer) to enhance the strength, the property of preventing an electrical current, or the property of holding an electrolyte. The reinforcing layer may be placed by an adhering to or coating on one or both surfaces of the ultrafine fibrous aggregate layer. Further, the reinforcing layer may be placed in the ultrafine fibrous aggregate layer as an intermediate layer. Preferably, the reinforcing layer has a property such that the above-mentioned properties of the separator of the present invention consisting only of the ultrafine fibrous aggregate can be maintained in the separator containing the reinforcing layer in addition thereto. For example, the thickness of the reinforcing layer is not limited, but is preferably 15 µm or less, more preferably 10 µm or less.

The separator of the present invention may be a laminate comprising a layer of a non-ultrafine fibrous aggregate, in addition to the layer of the ultrafine fibrous aggregate. The "non-ultrafine fibrous aggregate" means a fibrous aggregate wherein an average fiber diameter of non-ultrafine fibers constituting the non-ultrafine fibrous aggregate is more than 1 µm. When the separator of the present invention contains the non-ultrafine fibrous aggregate layer in addition to the ultrafine fibrous aggregate layer, a separator having an excellent ionic permeability and an excellent strength without considerably affecting the property of holding an electrolyte can be provided.

The average fiber diameter of the fibers constituting the non-ultrafine fibrous aggregate is not limited so long as it does exceed 1 µm, but is preferably 5 µm or less, more preferably 1.5 to 4 µm. When the separator of the present invention is the laminate of the ultrafine fibrous aggregate layer and the non-ultrafine fibrous aggregate layer, the laminate may be composed of one or more ultrafine fibrous aggregate layers and one or more non-ultrafine fibrous aggregate layers, but is preferably composed of an ultrafine fibrous aggregate layer and a non-ultrafine fibrous aggregate layer. Even if the separator of the present invention is a laminate composed of one or more ultrafine fibrous aggregate layers and one or more non-ultrafine fibrous aggregate layers, the entire thickness of the separator is 25 µm or less, preferably 20 µm or less.

The non-ultrafine fibrous aggregate may be, for example, (1) a non-ultrafine fibrous aggregate prepared by dispersing non-ultrafine fibers in a gaseous medium, and thermally adhering them, (2) a non-ultrafine fibrous aggregate prepared by a wet-laying method using non-ultrafine fibers, or (3) a non-ultrafine fibrous aggregate prepared by an electrostatic spinning process, or the like. Particularly, the non-ultrafine fibrous aggregate (1) prepared by dispersing non-ultrafine fibers in a gaseous medium, and thermally adhering the fibers, can enhance the mechanical strength of the separator, but does not contain an adhesive agent, a thickening agent or a surfactant, and thus does not lower an electrical insulation, and therefore is preferable. As the non-ultrafine fiber having an average fiber diameter of more than 1 μm, but not more than 5 μm, there may be mentioned, for example, non-ultrafine fibers prepared by removing sea components from islands-in-sea composite fibers, and thus is composed of island components, non-ultrafine fibers prepared by peeling off exfoliative composite fibers composed of two or more resins and having a cross-sectional fiber form of orange sections or a multilayered laminate, or non-ultrafine fibers prepared by spinning in accordance with a direct spinning method, such as a super-drawing method.

When the separator of the present invention contains the non-ultrafine fibrous aggregate, the thickness of the non-ultrafine fibrous aggregate is preferably 18 μm or less, more preferably 15 μm or less. Even if the separator contains the non-ultrafine fibrous aggregate as above, it preferably has the same mass per unit area, tensile strength, apparent density, and porosity same as those of the separator consisting only of the ultrafine fibrous aggregate. When the separator of the present invention contains the ultrafine fibrous aggregate layer or layers and the non-ultrafine fibrous aggregate layer and layers, a ratio (T1:T2) of the thickness (T1) of the ultrafine fibrous aggregate layer or layers and the thickness (T2) of the non-ultrafine fibrous aggregate layer or layers is preferably 1:4~4:1, more preferably 1:3~3:1.

The separator of the present invention may contain a reinforcing layer (such as a microporous film layer) capable of enhancing the strength, the property of preventing a leakage of an electrical current, or the property of holding an electrolyte, in addition to the ultrafine fibrous aggregate layer or layers and the non-ultrafine fibrous aggregate layer or layers. The reinforcing layer may be placed by adhering to or coating on one or both surfaces of the laminate of the ultrafine fibrous aggregate layer or layers and the non-ultrafine fibrous aggregate layer or layers, or between the ultrafine fibrous aggregate layer and the non-ultrafine fibrous aggregate layer. Further, the reinforcing layer may be placed in the ultrafine fibrous aggregate layer or layers and/or the non-ultrafine fibrous aggregate layer or layers as an intermediate layer. Preferably, the reinforcing layer has a property such that the above-mentioned properties of the separator of the present invention composed only of the laminate of the ultrafine fibrous aggregate layer or layers and the non-ultrafine fibrous aggregate layer or layers can be maintained in the separator containing the reinforcing layer in addition thereto. For example, the thickness of the reinforcing layer is not limited, but is preferably 10 μm or less, more preferably 5 μm or less.

When the separator of the present invention is composed only of the ultrafine fibrous aggregate, it may be prepared, for example, by (1) a fiberizing step comprising discharging a fiberizable solution containing resins of the fibers constituting the ultrafine fibrous aggregate (hereinafter referred to as ultrafine fibers) from nozzles, and at the same time applying an electrical field to the discharged fiberizable solution for fiberization, and (2) a collecting step comprising collecting the fiberized fibers on a collector to form the ultrafine fibrous aggregate.

More particularly, the fiberizable solution is prepared at the beginning. The fiberizable solution is a solution prepared by dissolving the resin forming the ultrafine fibers in a solvent. As the resin for the ultrafine fibers, for example, one or more of the above-mentioned resins may be used. The solvent may be selected in accordance with the resin to be used, and thus is not limited. There may be mentioned as the solvent, for example, water, acetone, methanol, ethanol, propanol, isopropanol, tetrahydrofuran, dimethyl sulfoxide, 1,4-dioxane, pyridine, N,N-dimethylformamide, N,N-dimethylacetoamide, N-methyl-2-pyrrolidone, acetonitrile, formic acid, toluene, benzene, cyclohexane, cyclohexanone, carbon tetrachloride, methylene chloride, chloroform, trichloroethane, ethylene carbonate, diethyl carbonate, propylene carbonate, or the like. The solvent may be used alone, or a mixture of two or more solvents may be used.

The fiberizable solution is prepared by dissolving the resins as above in one or more solvents. The concentration of the resin or resins may vary with a composition of the resins used, a molecular weight of the resin or resins, and/or the solvent or the solvents, and thus is not limited. However, in view of the applicability to the electrostatic spinning, the concentration corresponds to a viscosity of preferably 10 to 6000 mPa·s, more preferably 20 to 5000 mPa·s. If the viscosity is less than 10 mPa·s, the viscosity is too low to exhibit a sufficient stringiness, and thus it is difficult to obtain fibers. If the viscosity is more than 6000 mPa·s, the fiberizable solution becomes difficult to be drawn, and it is difficult to obtain fibers. The term "viscosity" as used herein means a value measured at 25° C. by an apparatus for measuring viscosity at a shear rate of 100 s$^{-1}$.

In the spinning step, the fiberizable solution is supplied to nozzles and discharged therefrom, and at the same time an electrical field is applied to the discharged fiberizable solution for fiberization. The diameter (internal diameter) is preferably about 0.1 to 2 mm so that an average fiber diameter of the fibers constituting the ultrafine fibrous aggregate can be easily adjusted to 1 μm or less. The nozzle may be made from a metal or non-metal material. When the nozzle is made from a metal, it can be used as one of the electrodes to apply an electrical field to the discharged fiberizable solution. When the nozzle is made from a non-metal material, an electrode is installed in the nozzle and an electrical field can be applied to the discharged fiberizable solution.

The fiberizable solution is discharged from the nozzles as above, and an electrical field is applied to the discharged fiberizable solution so that the solution is drawn and fiberized. The electrical field may vary with the average fiber diameter of the fibers constituting the ultrafine fibrous aggregate, a distance between the nozzle and the collector, the solvent of the fiberizable solution, the viscosity of the fiberizable solution, and the like, and thus is not limited. However, the electrical field is preferably 0.2 to 5 kV/cm so that the average fiber diameter of the fibers constituting the ultrafine fibrous aggregate can be adjusted to 1 μm or less. There is a tendency that the average fiber diameter of the fibers constituting the ultrafine fibrous aggregate is thinned with the increase of the electrical field applied. However, the electrical field exceeding 5 kV/cm is not preferable, because an air dielectric breakdown is liable to occur. When the electrical field is less than 0.2 kV/cm, it is difficult to obtain a fibrous shape.

As above, an electrical field is applied to the discharged fiberizable solution, and thus static charges are accumulated in the fiberizable solution. The solution is electrically attracted by the electrode placed on the side of the collector, and stretched to be fiberized. The fibers are electrically drawn, and thus, the rate of the fibers coming close to the collector is accelerated by the electrical field so that the fibers having a small average fiber diameter are obtained. Further, it is considered that the fibers are also thinned by evaporation of the solvent, and a repulsive force generated by an elevated static density causes cleavages of the fibers so that the fibers having a small average fiber diameter are obtained.

The electrical field as above can be applied by, for example, generating a difference in potential between an electrode in the collector side and an electrode in the nozzle side, that is, the nozzle per se in the case of the metal nozzle, or the electrode in the nozzle in the case of the non-metal nozzle, such as a glass or resin nozzle. For example, the difference in potential can be generated by applying a voltage to the electrode in the nozzle side and grounding the collector. Alternatively, the difference in potential can be generated by applying a voltage to the electrode in the collector side and grounding the electrode in the nozzle side. An apparatus for applying a voltage is not limited. For example, a DC high-voltage generator or Van De Graff electrostatic generator may be used. A voltage applied is not limited, so long as it may generate the electric field strength as above, but is preferably about 5 to 50 kV.

Subsequently, the collecting step (2) for accumulating the fiberized ultrafine fibers on the collector to form the ultrafine fibrous aggregate is carried out. The collector used in the collecting step (2) is not limited so long as it can accumulate the ultrafine fibers. For example, a non-woven fabric, woven fabric, knitted fabric, net, flat plate, drum, or belt made of an electrically conductive material such as metal or carbon, or an electrically non-conductive material such as an organic polymeric material may be used as the collector. When the collector is used as an electrode as above, it is preferably made of an electrically conductive material such as metal having a specific resistance of preferably $10^{10}$ Ω·cm or less, more preferably $10^9$ Ω·cm or less. On the other hand, when an electrically conductive material is positioned as a counter electrode behind the collector (when observed in a direction from the nozzle to the collector), the collector is not necessarily made of an electrically conductive material. When such a counter electrode is placed behind the collector as above, the collector may be brought into contact with the counter electrode, or may be separated from the counter electrode.

An orientation step comprising uniaxial orientation the ultrafine fibrous aggregate to rearrange the fibers in the orientation direction may be carried out so as to enhance a tensile strength of the ultrafine fibrous aggregate used in the separator of the present invention. The ultrafine fibers are in contact with each other, but are not fused or adhered to each other. Therefore, the ultrafine fibers can be rearranged in the orientation direction by the orientation treatment. The rearrangement produces a structure wherein the ultrafine fibers are unidirectionally arranged, and a breaking strength in the orientation direction is enhanced. The orientation direction is not limited. However, when a wound electric double layer capacitor is manufactured, the ultrafine fibrous aggregate is preferably drawn in a longitudinal direction of the separator because a tension is applied mainly in a longitudinal direction of the separator. Such an orientation can be carried out by, for example, a roll orientation method or a tenter frame orientation method. The temperature of the orientation step ranges preferably from $\{(Tg$ of the ultrafine fiber)$-30\}°$ C. to (Tg of the ultrafine fiber) ° C. The expression "Tg of the ultrafine fiber" means a glass transition temperature of the ultrafine fiber. The orientation treatment can be carried out without generating the breaking of the ultrafine fibrous aggregate or a change of the fiber diameters by performing the orientation treatment in the above temperature range. More preferably, the orientation treatment is carried out in the range from $\{(Tg$ of the ultrafine fiber)$-20\}°$ C. to $\{(Tg$ of the ultrafine fiber)$-10\}°$ C. It is preferable to pre-heat the ultrafine fibrous aggregate before the orientation and use the remaining heat for obtaining a good drawability. The range of the remaining heat is preferably the same as the above range for the orientation temperature. The "glass transition temperature" (Tg) means a temperature of an intersecting point of a tangent line of a baseline in a DTA curve measured by a differential thermal analyzer (DTA) and a tangent line of a precipitously declining point of an endothermal region by the glass transition.

A drawing magnification of the orientation treatment is preferably 2 times or more, more preferably 2.3 times or more, still more preferably 3 times or more so that the ultrafine fibers are sufficiently rearranged. The drawing magnification is a value (La/Lb) calculated by dividing a length (La) of the ultrafine fibrous aggregate after drawn by a length (Lb) of the ultrafine fibrous aggregate before drawn. A drawing rate is preferably 10 to 2000 mm/min, more preferably 50 to 1500 mm/min, still more preferably 100 to 1000 mm/min.

The ultrafine fibrous aggregate used in the separator of the present invention may be subjected to a densifying step comprising densifying the ultrafine fibrous aggregate with pressure, after the above orientation step or without carrying out the above orientation step. The densifying step is carried out so that the tensile strength and smoothness are enhanced, the mean flow pore size is adjusted to 1 μm or less, the maximum pore size is adjusted to not more than 3 times the mean flow pore size, the thickness is adjusted to 25 μm or less, the percentage of porosity is adjusted to 65% to 85%, and the apparent density is adjusted to 0.1 to 0.8 g/cm$^3$. The pressure applied in the densifying step is not particularly limited, but preferably the densifying step is carried out at a linear pressure of 5 N/cm or more so that the tensile strength per mass per unit area 1 g/m$^2$ can be increased to 0.15 N/5 mm width or more.

Preferably, the ultrafine fibrous aggregate is heated when pressed so that the tensile strength can be effectively increased. When heated as above, the ultrafine fibrous aggregate can be heated before being pressed or heated and pressed at the same time. In each case, the ultrafine fibrous aggregate is heated preferably at a temperature of less than the softening temperature of the ultrafine fibers, more preferably at a temperature lower by 10° C. or more than the softening temperature of the ultrafine fibers, still more preferably at a temperature lower by 20° C. or more than the softening temperature of the ultrafine fibers. The densifying step can be carried out by, for example, a calendar roll or a thermal calendar roll. The "softening temperature" as used herein means a temperature giving an initial point of a endothermal curve of fusion in a DSC curve obtained by a heat flux differential scanning calorimetry (DSC, elevating temperature 10° C./min) defined in JIS K 7121.

After the densifying step, the solvent of the fiberizable solution is preferably removed by heating at a temperature above the temperature at the densifying step but lower by 50° C. or more than the pyrolysis temperature of the ultrafine fibers. By the heating as above, a cross-linking or an intermolecular bonding of the resins constituting the ultrafine fibers can be progressively accelerated, and thus the tensile strength of the separator can be increased. As a result, the electric double layer capacitor can be more easily manufactured. The "pyrolysis temperature" means a temperature when a mass of a test sample is reduced by 5% in a thermogravimetric analysis defined in JIS K 7120.

The separator of the present invention composed of the non-ultrafine fibrous aggregate layer or layers in addition to the ultrafine fibrous aggregate layer or layers may be manufactured by, for example, (1) a method comprising mounting the non-ultrafine fibrous aggregate which has been prepared in advance, on the collector for collecting the ultrafine fibers as mentioned above, and fiberizing and collecting the ultrafine fibers on the non-ultrafine fibrous aggregate, (2) a method comprising separately preparing the non-ultrafine fibrous aggregate and the ultrafine fibrous aggregate, and fusing the non-ultrafine fibrous aggregate and/or the ultrafine fibrous aggregate with the fusibilities thereof, or (3) a method comprising separately preparing the non-ultrafine fibrous aggregate and the ultrafine fibrous aggregate, and adhering the non-ultrafine fibrous aggregate and the ultrafine fibrous aggregate with an adhesive agent, or the like.

Of the above methods (1) to (3), the separator composed of the non-ultrafine fibrous aggregate layer or layers and the ultrafine fibrous aggregate layer or layers is preferably manufactured by the method (1). This is because a small fiber diameter of the ultrafine fibers can be maintained, a uniform dispersion state can be maintained, and an ultrafine fibrous aggregate having a low mass per unit area can be reliably manufactured. The densifying step as above can be carried out after forming the ultrafine fibrous aggregate on the non-ultrafine fibrous aggregate. The above densifying step can enhance the adhesiveness of the ultrafine fibrous aggregate layer or layers and the non-ultrafine fibrous aggregate layer or layers, in addition to the above-mentioned advantageous effects of the densifying step. The methods (2) and (3) have an advantageous effect in that the ultrafine fibrous aggregate after the orientation step and/or the densifying step is available. The method (3) has an advantageous effect in that the strongest adhesion between the non-ultrafine fibrous aggregate layer or layers and the ultrafine fibrous aggregate layer or layers can be obtained. The method (2) can be carried out by a hot press, such as a press working with continuous fusing machine, as the densifying step.

The electric double layer capacitor of the present invention contains the above-mentioned separator, and has a low internal resistance and a long life time. Particularly, when the resins forming the above separator have a melting point or a carbonizing temperature of 300° C. or more, a drying step can be carried out after assembling the electrodes group from components for capacitor. Therefore, it is advantageous when an organic electrolyte is used.

The capacitor of the present invention is same as the conventional capacitor except that it contains the above-mentioned separator. For example, a thin metal plate such as a thin aluminum plate or a thin platinum plate can be used as a collecting electrode. As the electrode, an electrode prepared by mixing particulate activated carbon, an electrical conductive material and an adhesive agent and then forming by a green compact method, a calendaring method, a coating method, or a doctor blade method may be used. As the electrolyte, for example, an organic electrolyte prepared by dissolving tetraethylammonium tetrafluoroborate in propylene carbonate, or an organic electrolyte prepared by dissolving tetraethylphosphonium tetrafluoroborate in propylene carbonate, or the like may be used.

A process for manufacturing the electric double layer capacitor will be briefly explained. First, collecting electrodes, electrodes, and separators as mentioned above are prepared. Then, a collecting electrode, an electrode, a separator, an electrode, and a collecting electrode are accumulated in this order, and such an accumulation is repeated, and then the resulting accumulated laminate is wound to form an electrodes-group.

Subsequently, the electrodes-group and the organic electrolyte as mentioned above are incorporated into a case. Then, the case is sealed to obtain the capacitor. When the resins forming the above separator have a melting point or a carbonizing temperature of 300° C. or more, the formed electrodes-group can be dried at a temperature of 150° C. or more together with the collecting electrodes, the electrodes, and the separators, before insertion into the case. When the resins forming the above separator have a melting point or a carbonizing temperature of less than 300° C., the components are dried respectively, and then the electrodes-group is formed.

A cell of the electric double layer capacitor may be a laminate type, a coin type, a cylindrical type, a prismatic type, or the like.

EXAMPLES

The present invention now will be further illustrated by, but is by no means limited to, the following Examples.

Example 1

A fiberizable solution (solid content concentration: 12 wt %, viscosity: 1600 mPa·s) was prepared by dissolving polyacrylonitrile resin (softening temperature: 190 to 240° C., pyrolysis temperature: 350° C.) in N,N-dimethyl-formamide.

A fiberizing apparatus was prepared by connecting a syringe to a polytetrafluoroethylene tube, and attaching a stainless steel nozzle having an inner diameter of 0.6 mm at a tip of the tube. Then, the nozzle was connected to a high-voltage electric source. Further, a drum (collector, grounded) having a thin stainless steel plate with an electrically conductive fluorinated surface was placed at a position opposite to and separated from the nozzle (10 cm).

Thereafter, the fiberizable solution was introduced into the syringe, and discharged therefrom by a microfeeder in a direction perpendicular to the direction of gravitational force (discharging amount 1 mL/hour), while the drum was rotated at a constant rate (surface velocity: 3.6 m/min), a voltage of +15 kV was applied to the nozzle from the high-voltage electric source to apply an electrical field to the discharged fiberizable solution so that the fiberizable solution was fiberized. The ultrafine fibers were collected on the thin stainless steel plate of the drum to form a ultrafine fibrous aggregate.

Then, after a heat treatment at 160° C. for 5 minutes, a separator of the present invention (mass per unit area: 4.6 g/m$^2$, thickness: 24 μm) composed of the ultrafine fibrous aggregate was obtained. In the separator, the ultrafine fibers constituting the separator were continuous, no bundle-like portion was observed, and the ultrafine fibers were dispersed and not substantially entangled. Various properties of the separator (the ultrafine fibrous aggregate) are shown in Table 1.

Example 2

The procedure of Example 1 was repeated except that a fiberizable solution (solid content concentration: 10 wt %, viscosity: 1200 mPa·s) was prepared by dissolving polyacrylonitrile resin (softening temperature: 190~240° C., pyrolysis temperature: 350° C., glass transition temperature: 165° C.) in N,N-dimethylformamide and used, to thereby obtain a separator of the present invention (mass per unit area: 3 g/m$^2$, thickness: 13 μm) composed of the ultrafine fibrous aggregate. In the separator, the ultrafine fibers constituting the separator were continuous, no bundle-like portion was observed, and the ultrafine fibers were dispersed and not substantially entangled. Various properties of the separator (the ultrafine fibrous aggregate) are shown in Table 1.

Example 3

The procedure of Example 1 was repeated except that a fiberizable solution (solid content concentration: 9.5 wt %, viscosity: 700 mPa·s) was prepared by dissolving polyacrylonitrile resin (softening temperature: 190 to 240° C., pyrolysis temperature: 350° C.) in N,N-dimethylformamide, and used, and a distance between the nozzle and the drum (collector) was 5 cm, a voltage applied to the nozzle from the high-voltage electric source was +9 kV, and an amount discharged from the nozzle was 0.4 mL/hour, to thereby obtain a separator of the present invention (mass per unit area: 2.5 g/m², thickness: 11 μm) composed of the ultrafine fibrous aggregate. In the separator, the ultrafine fibers constituting the separator were continuous, no bundle-like portion was observed, and the ultrafine fibers were dispersed and not substantially entangled. Various properties of the separator (the ultrafine fibrous aggregate) are shown in Table 1.

Example 4

The procedure of Example 1 was repeated except that a fiberizable solution (solid content concentration: 10 wt %, viscosity: 210 mPa·s) was prepared by dissolving completely saponified polyvinyl alcohol resin (polymerization degree: 1000, glass transition temperature: 225° C., pyrolysis temperature: 280° C.) in water, and used, an voltage applied to the nozzle from the high-voltage electric source was +24 kV, and an amount discharged from the nozzle was 0.5 mL/hour, to thereby obtain a separator of the present invention (mass per unit area: 2 g/m², thickness: 9 μm) composed of the ultrafine fibrous aggregate. In the separator, the ultrafine fibers constituting the separator were continuous, no bundle-like portion was observed, and the ultrafine fibers were dispersed and not substantially entangled. Various properties of the separator (the ultrafine fibrous aggregate) are shown in Table 1.

Example 5

The procedure of Example 3 was repeated except that the collecting time was shortened to render the mass per unit area to 1 g/m², to thereby obtain an ultrafine fibrous aggregate (thickness: 4 μm). In the ultrafine fibrous aggregate, the ultrafine fibers constituting the ultrafine fibrous aggregate were continuous, no bundle-like portion was observed, and the ultrafine fibers were dispersed and not substantially entangled. Various properties (data measured after peeling the two-layered structural separator) of the ultrafine fibrous aggregate are shown in Table 1.

On the other hand, first polyester fibers [fineness: 0.11 dtex (fiber diameter: 3.2 μm), fiber length: 5 mm, melting point: 260° C., softening temperature: 253° C., cross sectional shape: circle] composed of polyethylene-terephthalate and second polyester fibers [fineness: 0.2 dtex (fiber diameter: 4.3 μm), fiber length: 3 mm, melting point: 260° C., softening temperature: 247° C., cross sectional shape: circle] composed of polyethyleneterephthalate were prepared.

Subsequently, an aqueous slurry was prepared by dispersing the first polyester fibers and the second polyester fibers at a mass ratio of 70:30. Then, the aqueous slurry was supplied to a paper-making machine equipped with a cylinder, an inclined short wire Fourdrinier, a cylinder and a Yankee drier, respectively, to obtain wet webs. The resulting wet webs were laminated to form a laminated wet web, which was then dried by a Yankee drier heated at a temperature of 120° C.

Thereafter, the dried laminated web was pressed at a linear pressure of 450 N/cm by passing through a pair of heat calenders at a temperature of 200° C. to obtain a wet-laid nonwoven fabric (non-ultrafine fibrous aggregate layer) having a mass per unit area of 6 g/m², a thickness of 15 μm, an apparent density of 0.40 g/cm³, and an average fiber diameter of 3.6 μm. Various properties (data measured after peeling the two-layered structural separator) of the wet-laid nonwoven fabric are shown in Table 1.

Subsequently, the ultrafine fibrous aggregate and the wet-laid nonwoven fabric were laminated, and pressed by a continuous fusing machine (ASAHI, JR-10000LTS) at a setting pressure of 0 kgf at 125° C. for 15 seconds to adhere to each other and thereby obtain a two layered structural separator (mass per unit area: 7 g/m², thickness: 18 μm, apparent density: 0.39 g/cm³, porosity: 71%).

Example 6

A orientation treatment of a ultrafine fibrous aggregate prepared as in Example 2 was carried out by a roll orientation machine in a constant-temperature bath heated at 150° C. in a direction parallel to a rotating direction of the drum collector, at a drawing rate of 500 mm/min, and at a drawing magnification of 2.3 times, to thereby obtain a separator. In the separator, the ultrafine fibers constituting the separator were continuous, no bundle-like portion was observed, and the ultrafine fibers were dispersed and not substantially entangled. Various properties of the separator (the ultrafine fibrous aggregate after the orientation treatment) are shown in Table 1.

Example 7

A heating treatment of an ultrafine fibrous aggregate prepared as in Example 2 was carried out in a dryer heated at 170° C. for 5 minutes, to thereby obtain a separator. In the separator, the ultrafine fibers constituting the separator were continuous, no bundle-like portion was observed, and the ultrafine fibers were dispersed and not substantially entangled. Various properties of the separator (the ultrafine fibrous aggregate after the heating treatment) are shown in Table 1.

Example 8

A densifying treatment of an ultrafine fibrous aggregate prepared as in Example 2 was carried out by a calendar roll at a temperature of 50° C. at a linear pressure of 0.8 kN/cm, to thereby obtain a separator. In the separator, the ultrafine fibers constituting the separator were continuous, no bundle-like portion was observed, and the ultrafine fibers were dispersed and not substantially entangled. Various properties of the separator (the ultrafine fibrous aggregate after the densifying treatment) are shown in Table 1.

Comparative Example 1

A polyimide porous membrane (Ube Industries) commercially available as a separator for an electric double layer capacitor was used as a separator. Various properties of the separator are shown in Table 1.

Comparative Example 2

First polyester fibers [fineness: 0.11 dtex (fiber diameter: 3.2 μm), fiber length: 5 mm, melting point: 260° C., softening temperature: 253° C., cross sectional shape: circle] composed of polyethylene-terephthalate and second polyester fibers

[fineness: 0.2 dtex (fiber diameter: 4.3 μm), fiber length: 3 mm, melting point: 260° C., softening temperature: 247° C., cross sectional shape: circle] composed of polyethyleneterephthalate were prepared.

Subsequently, an aqueous slurry was prepared by dispersing the first polyester fibers and the second polyester fibers at a mass ratio of 70:30. Then, the aqueous slurry was supplied to a paper-making machine equipped with a cylinder, an inclined short wire Fourdrinier, a cylinder and a Yankee drier, respectively, to obtain wet webs. The resulting wet webs were laminated to form a laminated wet web, which was then dried by a Yankee drier heated at a temperature of 120° C.

Thereafter, the dried laminated web was pressed at a linear pressure of 500 N/cm by passing through a pair of heat calendars heated at a temperature of 200° C. to obtain a wet-laid nonwoven fabric having a mass per unit area of 6 g/m$^2$, a thickness of 13 μm, and an apparent density of 0.45 g/cm$^3$, which was used as a separator. Various properties of the separator are shown in Table 1.

Comparative Example 3

A melt-blown non-woven fabric (mass per unit area: 10 g/m$^2$, thickness: 75 μm) composed of polypropylene fibers having an average fiber diameter of 3.5 μm was prepared by a conventional melt-blowing method and used as a separator. Various properties of the separator are shown in Table 1.

Comparative Example 4

Islands-in-sea type fibers (fineness: 1.7 dtex, cut into fibers having a length of 1 mm) obtained by a composite spinning method and composed of 61 island components of high density polyethylene and polypropylene in a sea component of polyester were prepared. The islands-in-sea type fibers were dipped in a 10 mass % aqueous solution of sodium hydroxide so that polyester sea component was extracted and removed by hydrolysis. The islands components-mixed with high density polyethylene and polypropylene were air-dried to obtain ultrafine fibers (fiber diameter: 2 μm, fiber length: 1 mm, not fibrillated, drawn, having substantially the same diameters in a fiber axial direction, cross sectional shape: islands-in-sea).

Then, after a slurry was prepared by dispersing the ultrafine fibers, the slurry was supplied to a paper-making machine equipped with a cylinder, an inclined short wire Fourdrinier, a cylinder and a suction drum drier, respectively, to obtain wet webs. The resulting wet webs were laminated to form a laminated wet web, which was then dried by a suction drum drier heated at a temperature of 140° C.

Thereafter, the dried laminated web was pressed at a linear pressure of 500 N/cm by passing through a calendar heated at a temperature of 60° C. to obtain a wet-laid nonwoven fabric having a mass per unit area of 6 g/m$^2$, a thickness of 13 μm, and an apparent density of 0.45 g/cm$^3$, which was used as a separator. Various properties of the separator are shown in Table 1.

Comparative Example 5

A condenser paper (Nippon Kodoshi Corp., mass per unit area: 16 g/m$^2$, thickness: 40 μm) commercially available as a separator for an electric double layer capacitor was used as a separator. Various properties of the separator are shown in Table 1.

Comparative Example 6

The procedure of Example 1 was repeated except that the collecting time was elongated so that the mass per unit area was 5.9 g/m$^2$, to thereby obtain a separator (thickness: 30 μm). Various properties of the separator are shown in Table 1.

[Evaluation of Properties]

(1) Evaluation of Property of Holding Electrolyte

Each separator sample cut into a disk shape (diameter: 30 mm) was placed at a temperature of 20° C. and relative humidity of 65% to moisture equilibrium, and then the mass ($M_0$) was measured. Then, each separator sample was dipped in propylene carbonate for ten minute so that air in each separator sample was substituted by propylene carbonate, and the propylene carbonate was held. Thereafter, each separator sample was sandwiched between upper three filter papers (diameter: 30 mm) and lower three filter papers (diameter: 30 mm), and after the whole was pressed by a booster pump at a pressure of 1.6 MPa for 30 seconds, a mass ($M_1$) of each separator sample was measured.

Then, a liquid-holding rate under pressure was calculated from the following equation:

$$\text{liquid-holding rate under pressure (\%)} = \{(M_1 - M_0)/M_0\} \times 100$$

The measurement was conducted four times for each separator sample, and an arithmetic average thereof was a liquid-holding rate under pressure. The results are shown in Table 2.

As apparent from Table 2, the separator of the present invention has a very excellent holding electrolyte property. It was able to expect that, even if the expansions and shrinkages of capacitor electrodes are repeated with each charge and discharge cycle, the electrolyte in the separator is very little squeezed, and thus a life time of the capacitor can be prolonged.

(2) Measurement of Internal Resistance

As an electrode, a product prepared by kneading particulate activated carbon, carbon black, and polytetrafluoroethylene was prepared. Further, an aluminum foil as a collecting electrode, separators prepared in Examples and Comparative Examples as separators, and a solution of tetraethylammonium tetrafluoroborate dissolved in propylene carbonate as an electrolyte were prepared. Then, 10 capacitors of a coin cell shape were manufactured from the above materials, for each separator sample, respectively.

Thereafter, an internal resistance of each capacitor was obtained from a charge and discharge curve measured by a charge and discharge tester. More particularly, it was obtained from the charge and discharge curve, which was obtained from an operation composed of a charging at a constant current of 1 A for 2 minutes to 2.5 V and a discharging for 2 minutes. The results are shown in Table 2. As apparent from Table 2, the separators of the present invention had an internal resistance of 2.2Ω or less, that is, an excellent ionic permeability.

(3) Measurement of Leakage Current

The coin cell capacitors used in the above item (2) "Measurement of internal resistance" were charged at a constant current of 20 mA to 2.5 V, and the voltage of 2.5 V was maintained for 24 hours from the initial stage of the charging. A leakage current was calculated from an amount of a voltage drop after allowing to stand at room temperature for 72 hours by the following equation:

$$i = C \times (dV/dt)$$

wherein "i" stands for a leakage current, C stands for a static capacity, dV stands for an amount of voltage drop, and dt stands for a time, respectively.

The results are shown in Table 2. The leakage current means a property of preventing a leakage of an electrical current. The lower the leakage current, the better the capacitor. The thickness of the capacitors containing the separators of the present invention was as thin as 25 μm or less. Nonetheless, they exhibited on 0.015 mA or less about an excellent property of preventing a leakage of an electrical current.

(4) Evaluation of Property of Preventing Short Circuit

Ten coin cell capacitors used in the above item (2) "Measurement of internal resistance" were manufactured for each sample. A percentage (fractional defective) of defective capacitors, which means a capacitor generating a short circuit after 100 charge and discharge cycles, was calculated. The results are shown in Table 2. The separators of the present invention exhibited an excellent property of preventing a short circuit, because they did not permeate electrode materials (carbon black or particulate activated carbon) which were dropped off due to the repeated expansions and shrinkages during the charging and discharging of the capacitor electrodes, and thus defective capacitors were not produced.

(5) Comprehensive Evaluation

A comprehensive evaluation was conducted on the basis of the results of the above items (1) to (4) by seven levels. The results are shown in Table 2. The seven levels are as follows:

⊚: Each of the property of holding an electrolyte, the property of preventing a short circuit, the ionic permeability, and the property of preventing leakage was more than excellent.
○: Each of the property of holding an electrolyte, the property of preventing a short circuit, the ionic permeability, and the property of preventing the leakage was excellent.
Δ1: The ionic permeability was poor, and therefore application is limited.
Δ2: The property of holding an electrolyte, and the ionic permeability were bad, and the fractional defective was high, and therefore, it was awkward to use.
Δ3: The ionic permeability was bad, and as it was thick, it is difficult to manufacture a thin capacitor.
×1: The property of holding an electrolyte was bad and the fractional defective was high, and therefore, it was impossible to use.
×2: The pore sizes of the separator widely varied, and a short circuit was generated, and therefore, a capacitor could not be manufactured.

TABLE 2

| | Liquid-holding rate under pressure (%) | Internal resistance (Ω) | Leakage current (mA) | Fractional defective (%) | Comprehensive evaluation |
|---|---|---|---|---|---|
| Example 1 | 250 | 2.1 | 0.012 | 0 | ⊚ |
| Example 2 | 250 | 1.9 | 0.010 | 0 | ⊚ |
| Example 3 | 265 | 1.6 | 0.013 | 0 | ⊚ |
| Example 4 | 290 | 1.3 | 0.010 | 0 | ⊚ |
| Example 5 | 140 | 2.2 | 0.015 | 0 | ○ |
| Example 6 | 220 | 2.1 | 0.012 | 0 | ○ |
| Example 7 | 240 | 1.9 | 0.011 | 0 | ⊚ |
| Example 8 | 170 | 2.0 | 0.013 | 0 | ○ |
| Comparative Example 1 | 15 | 3.0 | 0.011 | 0 | Δ1 |
| Comparative Example 2 | 10 | 2.0 | 0.025 | 50 | X1 |
| Comparitive Example 3 | 8 | Measuring impossible | — | — | X2 |
| Comparative Example 4 | 16 | Measuring impossible | — | — | X2 |
| Comparative Example 5 | 120 | 2.4 | 0.015 | 10 | Δ2 |
| Comparative Example 6 | 250 | 2.3 | 0.010 | 0 | Δ3 |

INDUSTRIAL APPLICABILITY

The separator of the present invention can be used as a separator for an electric double layer capacitor. Particularly, the separator of the present invention can advantageously be used as a separator for a thin electric double layer capacitor.

The electric double layer capacitor according to the present invention, which contains the above-mentioned separator, allows a large amount of charge and discharge, and therefore, is useful in various industrial fields, such as a portable information device, in an electrical vehicle, various types of auxiliary electrical power supply, a midnight power preservation, or the like.

Although the present invention has been described with reference to specific embodiments, various changes and modifications obvious to those skilled in the art are possible without departing from the scope of the appended claims.

TABLE 1

| | | Average fiber diameter (μm) | Ratio (Dd/Da) | Mass per unit area (g/m$^2$) | Thickness (μm) | Apparent density (g/cm$^3$) | Percentage of voids (%) | Maximum pore size (μm) | Mean flow pore size (μm) | Tensile strength (N/5 mm) |
|---|---|---|---|---|---|---|---|---|---|---|
| Example 1 | | 0.40 | 0.06 | 4.6 | 24 | 0.19 | 83 | 2.00 | 0.90 | 0.70 |
| Example 2 | | 0.20 | 0.20 | 3.0 | 13 | 0.23 | 81 | 1.00 | 0.55 | 0.53 |
| Example 3 | | 0.15 | 0.23 | 2.5 | 11 | 0.23 | 81 | 0.90 | 0.45 | 0.42 |
| Example 4 | | 0.10 | 0.20 | 2.0 | 9 | 0.22 | 82 | 0.75 | 0.35 | 0.42 |
| Example 5 | Ultrafine fibrous aggregate | 0.15 | 0.23 | 1.0 | 4 | 0.25 | 79 | 1.00 | 0.50 | 2.30 |
| | Wet-laid nonwoven fabric | 3.60 | 0.11 | 6.0 | 15 | 0.40 | 71 | 65.0 | 21.0 | |
| Example 6 | | 0.20 | 0.20 | 3.0 | 12 | 0.25 | 79 | 0.85 | 0.50 | 1.15 |
| Example 7 | | 0.20 | 0.20 | 3.0 | 13 | 0.23 | 81 | 1.00 | 0.53 | 0.53 |
| Example 8 | | 0.20 | 0.20 | 3.0 | 7 | 0.43 | 65 | 0.80 | 0.38 | 0.68 |
| Comparative Example 1 | | — | — | 11 | 18 | 0.61 | 30 | 10 | 0.2 | 9.1 |
| Comparative Example 2 | | 3.4 | 0.1 | 6 | 13 | 0.45 | 67 | 65 | 21 | 3 |
| Comparative Example 3 | | 3.5 | 0.5 | 10.0 | 75 | 0.13 | 85 | 250 | 9 | 0.37 |
| Comparative Example 4 | | 2 | 0.06 | 6 | 13 | 0.45 | 50 | 8 | 5.3 | 0.67 |
| Comparative Example 5 | | 0.68 | 0.48 | 16.0 | 40 | 0.40 | 73 | 1.79 | 0.52 | 2.30 |
| Comparative Example 6 | | 0.40 | 0.06 | 5.9 | 30 | 0.20 | 83 | 2.00 | 0.90 | 0.87 |

The invention claimed is:

1. A separator for an electric double layer capacitor, wherein the separator consists only of an ultrafine fibrous aggregate prepared by an electrostatic spinning process and heat-treated at 160° C. or higher, a thickness of the entire separator is 25 μm or less, an average fiber diameter of ultrafine fibers constituting said ultrafine fibrous aggregate is 1 μm or less, a maximum pore size of said ultrafine fibrous aggregate is not more than 3 times a mean flow pore size, an apparent density of said ultrafine fibrous aggregate is 0.1 to less than 0.27 g/cm$^3$, and a mass per unit area of the separator is 1 to less than 5 g/m$^2$.

2. The separator for an electric double layer capacitor according to claim 1, wherein a thickness of the entire separator is 20 μm or less.

3. The separator for an electric double layer capacitor according to claim 1, wherein said mean flow pore size of said ultrafine fibrous aggregate layer is 1 μm or less.

4. The separator for an electric double layer capacitor according to claim 1, wherein a ratio (Dd/Da) of a standard deviation (Dd) of fiber diameters of ultrafine fibers constituting said ultrafine fibrous aggregate layer to an average fiber diameter (Da) of ultrafine fibers constituting said ultrafine fibrous aggregate layer is 0.25 or less.

5. The separator for an electric double layer capacitor according to claim 1, wherein said ultrafine fiber is composed of at least one resin selected from the group consisting of polyacrylonitrile, polyvinylidene fluoride, polyimide, nylon, polystyrene, polyethylene glycol, polyvinyl alcohol, and polyvinyl pyrrolidone.

6. The separator for an electric double layer capacitor according to claim 1, further containing a non-ultrafine fibrous aggregate layer having an average fiber diameter of not less than 1 μm, in addition to said ultrafine fibrous aggregate layer.

7. The separator for an electric double layer capacitor according to claim 1, wherein a porosity of said separator is 50% to 95%.

8. The separator for an electric double layer capacitor according to claim 1, wherein a tensile strength per 1 g/m$^2$ in mass per unit area is 0.15 N/5 mm width or more in at least one direction of said separator.

9. An electric double layer capacitor comprising said separator according to any one of claims 1 to 8.

10. The separator for an electric double layer capacitor according to claim 9, wherein said apparent density is 0.1 to 0.23 g/cm$^3$.

* * * * *